US011947460B2

(12) United States Patent
Vasekin et al.

(10) Patent No.: US 11,947,460 B2
(45) Date of Patent: Apr. 2, 2024

(54) TREATING MULTIPLE CACHE LINES AS A MERGED CACHE LINE TO STORE MULTIPLE BLOCKS OF DATA

(71) Applicant: Arm Limited, Cambridge (GB)

(72) Inventors: Vladimir Vasekin, Cambridge (GB); David Michael Bull, Cambridge (GB); Vincent Rezard, Vence (FR); Anton Antonov, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/729,233

(22) Filed: Apr. 26, 2022

(65) Prior Publication Data

US 2023/0342298 A1   Oct. 26, 2023

(51) Int. Cl.
*G06F 12/08* (2016.01)
*G06F 9/38* (2018.01)
*G06F 12/0842* (2016.01)
*G06F 12/0891* (2016.01)

(52) U.S. Cl.
CPC ........ *G06F 12/0842* (2013.01); *G06F 9/3816* (2013.01); *G06F 12/0891* (2013.01); *G06F 2212/1021* (2013.01)

(58) Field of Classification Search
CPC .............. G06F 12/0842; G06F 9/3816; G06F 12/0891; G06F 2212/1021
See application file for complete search history.

(56) References Cited

U.S. PATENT DOCUMENTS

| | | | |
|---|---|---|---|
| 2009/0216915 A1* | 8/2009 | Dunn ..................... | G06F 13/28 710/22 |
| 2014/0032846 A1* | 1/2014 | Avudaiyappan .... | G06F 12/0895 711/119 |
| 2019/0004970 A1* | 1/2019 | Pham .................... | G06F 3/0673 |
| 2019/0286563 A1* | 9/2019 | Swamy ............... | G06F 12/0842 |
| 2022/0091980 A1* | 3/2022 | Kayiran ............. | G06F 13/1668 |

* cited by examiner

*Primary Examiner* — Masud K Khan
(74) *Attorney, Agent, or Firm* — NIXON & VANDERHYE P.C.

(57) ABSTRACT

Apparatus, method and code for fabrication of the apparatus, the apparatus comprising a cache providing a plurality of cache lines, each cache line storing a block of data; cache access control circuitry, responsive to an access request, to determine whether a hit condition is present in the cache; and cache configuration control circuitry to set, in response to a merging trigger event, merge indication state identifying multiple cache lines to be treated as a merged cache line to store multiple blocks of data, wherein when the merge indication state indicates that the given cache line is part of the merged cache line, the cache access control circuitry is responsive to detecting the hit condition to allow access to any of the data blocks stored in the multiple cache lines forming the merged cache line.

19 Claims, 8 Drawing Sheets

TREATING MULTIPLE CACHE LINES AS A MERGED CACHE LINE TO STORE MULTIPLE BLOCKS OF DATA

TECHNICAL FIELD

The present technique relates to the field of data processing systems.

BACKGROUND

In a data processing system, one or more caches may be provided between requesters (e.g. processing circuitry configured to issue requests to access data in memory) and memory. The caches may store a subset of the data stored in memory, such that the requesters can access that data in the caches, rather than accessing memory. This can reduce latency/improve performance, since accesses to a cache are typically associated with lower latency than accesses to memory. Typically, a cache may store data in cache lines, each of which is associated with a given memory address indication, and is accessible independently of any other cache lines. Hence, if a hit in a given cache line is detected in response to an access request, due to it being determined from the memory address indication of that given cache line that the cache line stores data for the target address indicated by the access request, then the data at that target address can be accessed in the cache line. This means that, if a requester requires access to data spanning multiple cache lines, multiple access requests are issued, to access the data stored in the multiple cache lines.

SUMMARY

Viewed from one example, the present technique provides an apparatus comprising: a cache providing a plurality of cache lines and associated address indication entries, each cache line arranged to store a block of data and the associated address indication entry arranged, by default, to store a memory address indication for the block of data;
  cache access control circuitry, responsive to an access request issued by at least one processing element and indicating a target memory address, to determine whether a hit condition is present in the cache, the hit condition being present when a given cache line is determined, with reference to the memory address indication stored in the associated address indication entry, to store data associated with the target memory address; and
  cache configuration control circuitry to set, in response to detecting a merging trigger event, merge indication state to identify multiple cache lines amongst the plurality of cache lines that are to be treated as a merged cache line to store multiple blocks of data,
  wherein when the merge indication state indicates that the given cache line is part of the merged cache line, the cache access control circuitry is responsive to detecting the hit condition to allow access to any of the data blocks stored in the multiple cache lines forming the merged cache line.

Viewed from another example, the present technique provides a method comprising:
  providing, in a cache, a plurality of cache lines and associated address indication entries, each cache line arranged to store a block of data and the associated address indication entry arranged, by default, to store a memory address indication for the block of data;
  determining, in responsive to an access request issued by at least one processing element and indicating a target memory address, whether a hit condition is present in the cache, the hit condition being present when a given cache line is determined, with reference to the memory address indication stored in the associated address indication entry, to store data associated with the target memory address;
  setting, in response to detecting a merging trigger event, merge indication state to identify multiple cache lines amongst the plurality of cache lines that are to be treated as a merged cache line to store multiple blocks of data; and
  allowing, when the merge indication state indicates that the given cache line is part of the merged cache line, in response to detecting the hit condition, access to any of the data blocks stored in the multiple cache lines forming the merged cache line.

Viewed from another example, the present technique provides a non-transitory computer-readable medium to store computer-readable code for fabrication of an apparatus comprising:
  a cache providing a plurality of cache lines and associated address indication entries, each cache line arranged to store a block of data and the associated address indication entry arranged, by default, to store a memory address indication for the block of data;
  cache access control circuitry, responsive to an access request issued by at least one processing element and indicating a target memory address, to determine whether a hit condition is present in the cache, the hit condition being present when a given cache line is determined, with reference to the memory address indication stored in the associated address indication entry, to store data associated with the target memory address; and
  cache configuration control circuitry to set, in response to detecting a merging trigger event, merge indication state to identify multiple cache lines amongst the plurality of cache lines that are to be treated as a merged cache line to store multiple blocks of data;
  wherein when the merge indication state indicates that the given cache line is part of the merged cache line, the cache access control circuitry is responsive to detecting the hit condition to allow access to any of the data blocks stored in the multiple cache lines forming the merged cache line.

Further aspects, features and advantages of the present technique will be apparent from the following description of examples, which is to be read in conjunction with the accompanying drawings.

DESCRIPTION OF EXAMPLES

Figure 1:
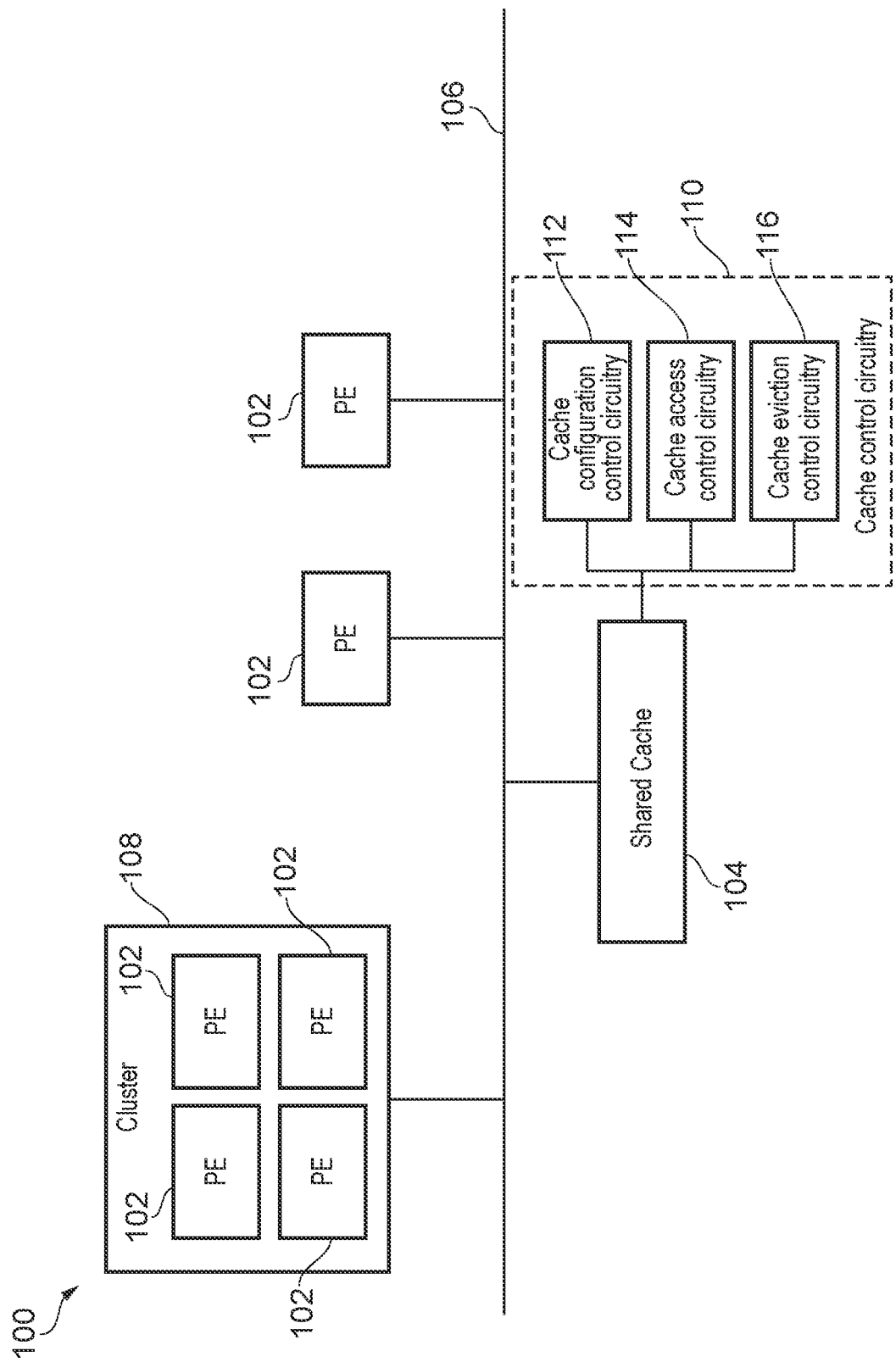
FIG. 1 schematically illustrates a system comprising multiple processing elements having access to a shared cache.

Before discussing example implementations with reference to the accompanying figures, the following description of example implementations and associated advantages is provided.

In accordance with one example configuration there is provided an apparatus comprising a cache providing a plurality of cache lines and associated address indication entries, each cache line arranged to store a block of data and the associated address indication entry arranged, by default, to store a memory address indication for the block of data. The apparatus also comprises cache access control circuitry, responsive to an access request issued by at least one processing element and indicating a target memory address, to determine whether a hit condition is present in the cache, the hit condition being present when a given cache line is determined, with reference to the memory address indication stored in the associated address indication entry, to store data associated with the target memory address. The apparatus also comprises cache configuration control circuitry to set, in response to detecting a merging trigger event, merge indication state to identify multiple cache lines amongst the plurality of cache lines that are to be treated as a merged cache line to store multiple blocks of data. When the merge indication state indicates that the given cache line is part of the merged cache line, the cache access control circuitry is responsive to detecting the hit condition to allow access to any of the data blocks stored in the multiple cache lines forming the merged cache line.

In a data processing system, a processing element (e.g. a central processing unit (CPU), graphics processing unit (GPU), etc.) may be provided, which can issue access requests to access (e.g. read or write) data—e.g. this could include memory access requests to access data stored in memory. Such an access request indicates a target memory address—e.g. this could be a target physical address or a target virtual address—identifying the data to be accessed—for example, the target memory address may identify a location in memory at which the data to be accessed is stored.

Access requests issued by at least one processing element can be serviced by a cache—for example, if a copy of the requested data is stored in the cache, the data may be accessed in the cache instead of in memory. This leads to a reduction in latency, since accessing data in a cache is typically quicker than accessing data in memory (e.g. because a cache is typically much smaller than memory).

A cache provides multiple cache lines, each capable of holding a block of data—for example, each cache line may be an entry in the cache holding a block of data of a predetermined size (although it should be noted that the block of data itself may be made up of multiple data elements, for example data words). In addition, each cache line is associated with a corresponding address indication entry which, in a default mode of operation, stores a memory address indication (e.g. this could be a tag based on a portion of a virtual address or a portion of a physical address) for the corresponding block of data. The address indications allow the cache access circuitry to identify whether the cache holds a copy of the requested data—for example, in response to an access request specifying a given target address, the cache access control circuitry can identify whether the corresponding data is stored in the cache by checking whether any of the address indications stored in the cache match an address indication derived from the target address. By such an approach, the cache access control circuitry hence can determine whether a hit condition exists in the cache for a given target memory address, based on the address indication entries. In the default mode, individual cache lines are accessed independently—for example, when the cache access control circuitry detects a hit against a cache line in the default mode, the cache access control circuitry may access the data block in that cache line. Accordingly, in the default mode, if the processing element needs to access data spanning multiple cache lines, a separate access request is issued for each cache line.

The inventors realised that such accesses to data spanning multiple cache lines can incur significant extra latency when compared with only accessing the data in a single cache line, and hence that it would be useful to be able to reduce that latency. This may particularly be the case in systems where a given block of data spanning two or more cache lines is accessed repeatedly.

The present technique provides a mechanism for reducing the latency associated with accessing data spanning multiple cache lines. In particular, the present technique provides a mechanism that allows multiple cache lines in the cache to be treated as a single, merged cache line that can be accessed in response to a single access request. This allows the latency associated with accessing data spanning multiple cache lines to be reduced, by reducing the number of separate cache accesses that need to be performed to access the data.

According to the present technique, cache configuration control circuitry is provided, which is responsive to a merging trigger event to merge multiple cache lines into a single merged cache line, in particular by setting merge indication state to identify those multiple (e.g. two or more) cache lines as part of a single merged cache line. For example, the merge indication state may be information associated with (e.g. stored in association with) one or more of the multiple cache lines. Once the merge indication state has been set for the merged cache line, the cache access control circuitry is responsive to detecting a hit condition for access requests specifying a target address corresponding to data in one of the cache lines forming the merged cache line to allow access to any (or, potentially, all) of the data blocks stored in the multiple cache lines forming the merged cache line (e.g. the data blocks in multiple cache lines can be accessed in response to a single access request specifying a single target address). As explained above, this reduces the latency associated with accesses to blocks of data which are larger than the size of a data block that can be stored within a single cache line and this, in turn, allows the performance of the apparatus as a whole to be improved.

Moreover, by providing merge indication state which can be set in response to detection, by the cache configuration control circuitry, of a merging trigger event, it is possible to switch a group of cache lines between the default state (where the cache lines are accessed independently) and the merged state (where the cache lines are treated as a merged cache line). This allows for improved flexibility, so that the cache can respond to the varying needs of the one or more processing elements which have access to the cache.

In some examples, in absence of the merge indication state indicating that the given cache line is part of the merged cache line, the cache access control circuitry is responsive to detecting the hit condition to access only the data block of the given cache line.

Hence, in a default state, individual cache lines can be accessed independently of each other. This allows the cache configuration control circuitry to adjust the effective size of cache lines in the cache (e.g. by merging cache lines to effectively generate larger cache lines, or by un-merging cache lines to return to a default size of cache line), to respond to the needs of one or more processing elements which have access to the cache. This approach also allows some of the plurality of cache lines to be part of merged cache lines, while others of the plurality of cache lines are not part of merged cache lines, so that the cache can effectively provide cache lines of multiple different sizes.

In some examples, the multiple blocks of data in the merged cache line have a common memory address indication. All of the multiple blocks of data may be represented by the same memory address indication; for example, this could be the memory address indication that would have been associated with one of the multiple cache lines in the absence of the merge indication state being set, or may be a common address portion shared by all of the data blocks stored within the multiple cache lines. However, these are merely two examples and any suitable technique may be employed for providing the common memory address indication. In any case, by providing a common (e.g. shared) memory address indication for all of the multiple cache lines forming the merged cache line, an access request need only specify a target address that is considered to match with the common memory address indications (for example by falling within a range of addresses indicated by the common memory address indication), in order to access the multiple blocks of data stored in the merged cache line (assuming any other criteria that may limit access rights are met).

In some examples, the cache configuration control circuitry is arranged to cause the common memory address indication to be stored in the address indication entry of one of the multiple cache lines forming the merged cache line.

This is similar to what would be stored in the address indication entry in the default state, except that the common memory address indication is, in these examples, an address indication for the data in all of the multiple cache lines forming the merged cache line, rather than just the data in one of the multiple cache lines. Alternatively the common memory address indication may be stored in the address indication entry of each of the multiple cache lines (e.g. the multiple cache lines could all store identical memory address indications). However, this redundancy (e.g. storing multiple copies of the common memory address indication) might be considered unnecessary, and the common memory address indication could instead be stored in address indication entries of a subset (e.g. a proper subset—one or more, but not all) of the multiple cache lines, such that the address indication for some of the multiple cache lines is stored in the address indication entry corresponding to a different cache line.

In some examples, the cache configuration control circuitry is configured to store the merge indication state in association with at least one address indication entry associated with one of the multiple cache lines forming the merged cache line.

For example, the merge indication state could be stored in the address indication entry for one of the multiple cache lines—e.g. it could be an extra bit appended to the address indication—or it could be stored in a separate field associated with the address indication. In a particular example, the merge indication state may include a value stored for each address indication entry. For example, this could be a value stored for each cache line. In some examples, the cache is shared between multiple processing elements including the at least one processing element.

The present technique may be particularly advantageous in data processing systems wherein multiple processing elements (e.g. multiple processors, such as CPUs and GPUs) share access to the cache. For example, different processing elements might have different requirements, which may mean that some processing elements regularly require access to multiple blocks of data (e.g. data spanning multiple cache lines in the cache), while other processing elements may not. Hence, the present technique can be particularly advantageous in such situations, by providing a cache which can act as though it has a variable cache line size—e.g. cache lines can be accessed individually in the default configuration, or as merged cache lines when the merge indication state is set.

In some examples, the apparatus comprises interconnect circuitry to provide communication pathways between the multiple processing elements, the multiple processing elements being coupled to the interconnect circuitry, wherein the cache is separated into multiple slices, and at least two of the slices are associated with different parts of the interconnect circuitry.

In some implementations, the cache is made up of multiple (e.g. two or more) slices, each of which may provide a subset of the plurality of cache lines and the address indication entries associated with that subset. Hence, access requests to access data stored in the cache may be serviced by different slices. Such an arrangement can be advantageous, because it may be possible for multiple slices of the same cache to be accessed in parallel, hence improving throughput. It may also be possible to power off some of the slices of the cache, while keeping other slices in operation—this can lead to improvements in power efficiency.

In addition, the multiple cache slices may be distributed across the interconnect circuitry. In particular, each of at least two of the multiple slices may be associated with a different part of the interconnect circuitry. Distributing the cache slices amongst two or more parts of the interconnect circuitry in this way can alleviate congestion issues within the interconnect circuitry, by spreading traffic to and from the cache around the interconnect circuitry.

However, a downside of distributing a cache across multiple locations in an interconnect is that the latency associated with some cache accesses may be increased. Hence, the inventors realised that the present technique can be particularly advantageous when applied to a cache which is distributed across an interconnect.

It should be noted, however, that it is also possible for the cache to comprise a plurality of slices that are not distributed across the network in this way. This would still provide improved bandwidth, but would not provide the reduced congestion associated with distributing the slices across the network.

In some examples, the interconnect circuitry comprises a ring interconnect formed of nodes and links between the nodes, the multiple processing elements are each connected to one of the nodes, and the at least two of the slices are associated with different nodes.

For example, messages sent from one node to another node (e.g. from a request node (such as a processing element) to a completer node (such as memory access control circuitry) or to a cache slice associated with a node) may travel between the nodes along the links, potentially via one or more other nodes. The links, therefore, can provide communication pathways between the nodes. In this example, each of at least two slices of the cache are associated with different nodes—hence, the routes between a given processing element and each of the at least two slices are different (e.g. including different links and/or different intervening nodes).

The merging trigger event can take a variety of forms dependent on implementation. In some examples, the merging trigger event comprises one of a set of merging trigger events, and the set of merging trigger events comprises at least one of:
- a request from the at least one processing element to merge the multiple cache lines to form the merged cache line;
- a determination that a pattern of previous accesses to the multiple cache lines meets at least one criterion; and a determination that the at least one processing element is of a given type.

For example, a request from the at least one processing element to merge the multiple cache lines to form a merged cache line could be an explicit request, identifying the cache lines to be merged, or it could be an implicit request to merge the multiple cache lines. An example of an implicit request to merge the multiple cache lines might be an access request issued by the at least one processing element that identifies more than one cache line (e.g. the multiple cache lines) to be accessed; the cache configuration control circuitry may then, if the multiple cache lines are not merged at the time of receiving the request, interpret this access request as an implicit request to merge the identified cache lines.

In the second example of a merging trigger event, the pattern of previous accesses to the multiple cache lines could, for example, be a number of times that one of the multiple cache lines has been accessed within a predetermined time of accessing another of the multiple cache lines—for example, a counter could be provided to count the number of times a given cache line is accessed within a given number of cycles of accessing another cache line. Hence, in a particular example, the merging trigger event could be a determination, by the cache configuration control circuitry, that the number of times that one of the multiple cache lines has been accessed within a predetermined time of accessing another of the multiple cache lines exceeds some threshold number.

In the third example, the given type of processing element may be a processing element that is more likely to issue access results to multiple cache lines within a short period of time. For example, a processor which is configured to execute instructions with a high level of parallelism (e.g. which can execute multiple instructions at once, (in parallel)) may be more likely to request access to multiple cache lines within a short period of time than a processor which executes instructions sequentially (e.g. one at a time). In such an example, the cache configuration control circuitry may be configured to merge the multiple cache lines into a single merged cache line when the at least one processing element requesting access to the data in question comprises a processing element arranged to execute multiple instructions in parallel. As another example, if the processor is configured to perform types of operation that use large blocks of data, for example matrix multiplication, then it may be appropriate to configure the cache to merge cache lines to hold the data being accessed by that processor. In such examples, the cache configuration control circuitry may periodically check for a merging trigger event (e.g. by periodically checking whether a processing element of the given type is performing particular types of operations and/or making access requests to data within a particular range of memory addresses), or each time a miss (e.g. absence of a hit) is detected in the cache.

In some examples, the cache configuration control circuitry is responsive to an unmerge trigger event to clear the merge indication state to indicate that the multiple cache lines are to be treated as independent cache lines.

In addition to the merging trigger event, the cache configuration control circuitry of this example is further responsive to an unmerge trigger event—which indicates that the multiple cache lines should no longer be treated as a merged cache line—to unmerge the multiple cache lines by clearing the merge indication state associated with the multiple cache lines. For example, the unmerge trigger event could be an indication that a merge trigger condition (e.g. that triggered the merging trigger event) no longer applies. This allows the multiple cache lines to be returned to their default state, where each can be accessed independently of the other cache lines.

The particular form of the unmerge trigger event may depend on the particular implementation, but in some examples the unmerge trigger event may be one or more of the following:
- a request from the at least one processing element to unmerge the multiple cache lines, so that the multiple cache lines are treated as independent cache lines (this could be an explicit request or an implicit request, as discussed above with reference to the merging trigger event);
- a determination that a pattern of previous accesses to the merged cache line (e.g. a number of accesses to the merged cache lines that request access to a single data block held in one of the multiple cache lines forming the merged cache lines) meets at least one further criterion (e.g. the number or frequency of accesses exceeding a given threshold); and
- a determination that no processing elements of the given type are still accessing the data stored in the merged cache lines.

However, it will be appreciated that these are just some examples of possible unmerge trigger events, and other examples are also possible.

In some examples, the cache comprises an N-way set-associative cache comprising a plurality of sets, each set comprising a cache line from each way, wherein the cache access control circuitry is responsive to the access request to identify a given set based on a portion of the target memory address and determine whether the hit condition is present for any cache line of the given set. Then, when the merge indication state indicates that the given cache line for which the hit condition is detected is part of the merged cache line, the multiple cache lines forming the merged cache line may be cache lines in the same way as the way containing the given cache line.

In an N-way set-associative cache with two or more sets, each set is arranged to store data blocks from a particular collection of addresses—for example, each set may be associated with a given index (e.g. derived from part of a memory address), and only data blocks associated with that index are permitted to be stored in that set. When accessing data in a set associative cache, the cache access control circuitry first identifies the set corresponding to the target memory address (e.g. by determining an index based on the target memory address and comparing the index with the index of each set), and then checks memory address indications associated with the cache lines of each way in the identified set to determine whether the requested data is stored in any of the ways. If a hit is detected, the cache access circuitry then accesses the data in the cache line of the corresponding way. Hence, the cache access circuitry typically only accesses a single way at a time. It can therefore be advantageous for all of the multiple cache lines forming the merged cache line to be within the same way, since this avoids the need to access multiple ways when accessing the merged cache line.

In some examples, the multiple cache lines forming the merged cache line are adjacent to each other in the cache.

This may simplify implementation of the present technique, by making it easier to identify which cache lines form part of the merged cache line. However, in some implementations, it may also be possible for the multiple cache lines forming the merged cache line to be non-consecutive (e.g. non-adjacent) cache lines in the cache (or a cache way).

In some examples, the cache configuration control circuitry is configured to store the merge indication state in association with one or more of the multiple cache lines forming the merged cache line, and the cache access control circuitry is configured to identify, when the merge indication state comprises a predetermined value stored in association with the given cache line, a series of one or more cache lines adjacent to each other and to the given cache line as forming the merged cache line together with the given cache line.

In this example, the multiple cache lines forming the merged cache line are adjacent to one another in the cache (e.g. they form a series of cache lines which are adjacent to one another). This allows a predetermined value stored in association with a given one of the multiple cache lines to indicate that the given cache line is to be treated as a merged cache line with one or more cache lines adjacent to the given cache line and/or to each other. For example, the given cache line could be the first in a series of M cache lines forming the merged cache line, and hence the cache access circuitry may be configured to interpret the predetermined value as indicating that the next M−1 cache lines following the given cache line are part of the merged cache line with the given cache line. Similarly, the given cache line could be the last in the series of cache lines forming the merged cache line.

Accordingly, this example provides a technique which allows multiple adjacent cache lines to be identified as part of the merged cache line, such that the amount of additional state that needs to be recorded to provide the merge indication state can be reduced.

In some examples, the apparatus may further provide cache eviction control circuitry configured to apply a cache eviction policy to select a selected cache line whose data block is to be evicted from the cache to allow a different data block to be stored in the selected cache line. The cache eviction control circuitry may be configured to avoid selecting, as the selected cache line, one of the multiple cache lines forming the merged cache line without also selecting the others of the multiple cache lines.

A cache eviction policy—e.g. a policy such as least-recently-used (LRU), least-frequently-used (LFU), random replacement (RR), or any other cache eviction policy—identifies a set of rules used by the cache eviction control circuitry to decide which data to evict (e.g. flush and/or invalidate) from the cache when new data needs to be stored in the cache. The cache eviction policy used by the cache eviction control circuitry is dependent on the particular implementation of the present technique, but whichever policy is used, it can be useful to ensure that all of the multiple cache lines forming the merged cache line are, when the merge indication state is set, kept together, either by avoiding evicting the data blocks held in these cache lines, or by ensuring that the data stored in all of the multiple cache lines is evicted together (e.g. either the entire merged cache line is flushed and/or invalidated, or none of the merged cache line is flushed and/or invalidated).

In some examples, the cache comprises a merge indication state field associated with each of the plurality of cache lines, and the cache configuration control circuitry is responsive to detecting the merging trigger event to set, as the merge indication state, a value in the merge indication state field associated with each of the multiple cache lines forming the merged cache line.

The value associated with each of the multiple cache lines can be any value—for example it could be a two-bit value (00, 01, 10, or 11), and different values could be used for indicating the first cache line in the merged cache line and the other cache lines in the merged cache line. For example, the merge indication state could comprise a first value stored in association with one of the multiple cache lines and a second value stored in association with each of the other cache lines in the multiple cache lines.

In some examples, the multiple cache lines forming the merged cache line comprise $2^N$ cache lines, wherein N is an integer.

Data stored in memory may typically be accessed in units of $2^N$ (e.g. 2, 4, 8, etc.) cache lines, and so it can be advantageous if the multiple cache lines forming the merged cache line comprise $2^N$ cache lines. In particular, if the multiple cache lines comprise $2^N$ cache lines, this allows all of the multiple cache lines to be accessed by, for example, selectively ignoring one or more least-significant bits of the target memory address.

In some examples, communication between the at least one processing element and the cache comprises packets comprising an indication of a number of cache lines accessed in response to the access request.

For example, access requests sent by the at least one processing element to the cache, as well as responses sent by the cache to the at least one processing element (e.g. in response to access requests issued by the at least one processing element—for read requests, this could include a copy of the requested data, while for write requests the response may be an indication of whether or not the write was successful) may be arranged as packets. The indication of the number of cache lines to be accessed can be useful to indicate which data blocks within the merged cache line are requested or have been accessed, for example.

In some examples, the merging trigger event comprises a request from the at least one processing element to merge the multiple cache lines to form the merged cache line, and the request comprises, in the packet, an indication that the number of cache lines to be accessed is greater than or equal to 2.

This is an example of an implicit request from the processing element to merge the multiple cache lines, as discussed above—e.g. instead of explicitly requesting that the multiple cache lines be merged, the processing element may simply request access to more than one cache line, and the cache configuration control circuitry may respond by merging the requested cache lines. Note that the number of cache lines merged need not necessarily be equal to the number of cache lines requested.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular examples will now be described with reference to the figures.

FIG. 1 shows an example of a data processing system 100, which comprises a plurality of processing elements 102—in this case, 6 processing elements are shown, but it will be appreciated that the data processing system can in fact comprise any number (e.g. one or more) of processing elements. Each of the processing elements 102 has access to a shared cache 104 via an interconnect 106. Some of the processing elements 102 are arranged in a cluster 108—in this case, four processing elements 102 are arranged in the cluster 108, but it will be appreciated that any number of processing elements could, in principal, be provided in the cluster 108. Moreover, it should be appreciated that it is not essential for any of the processing elements to be arranged in a cluster.

Figure 2:
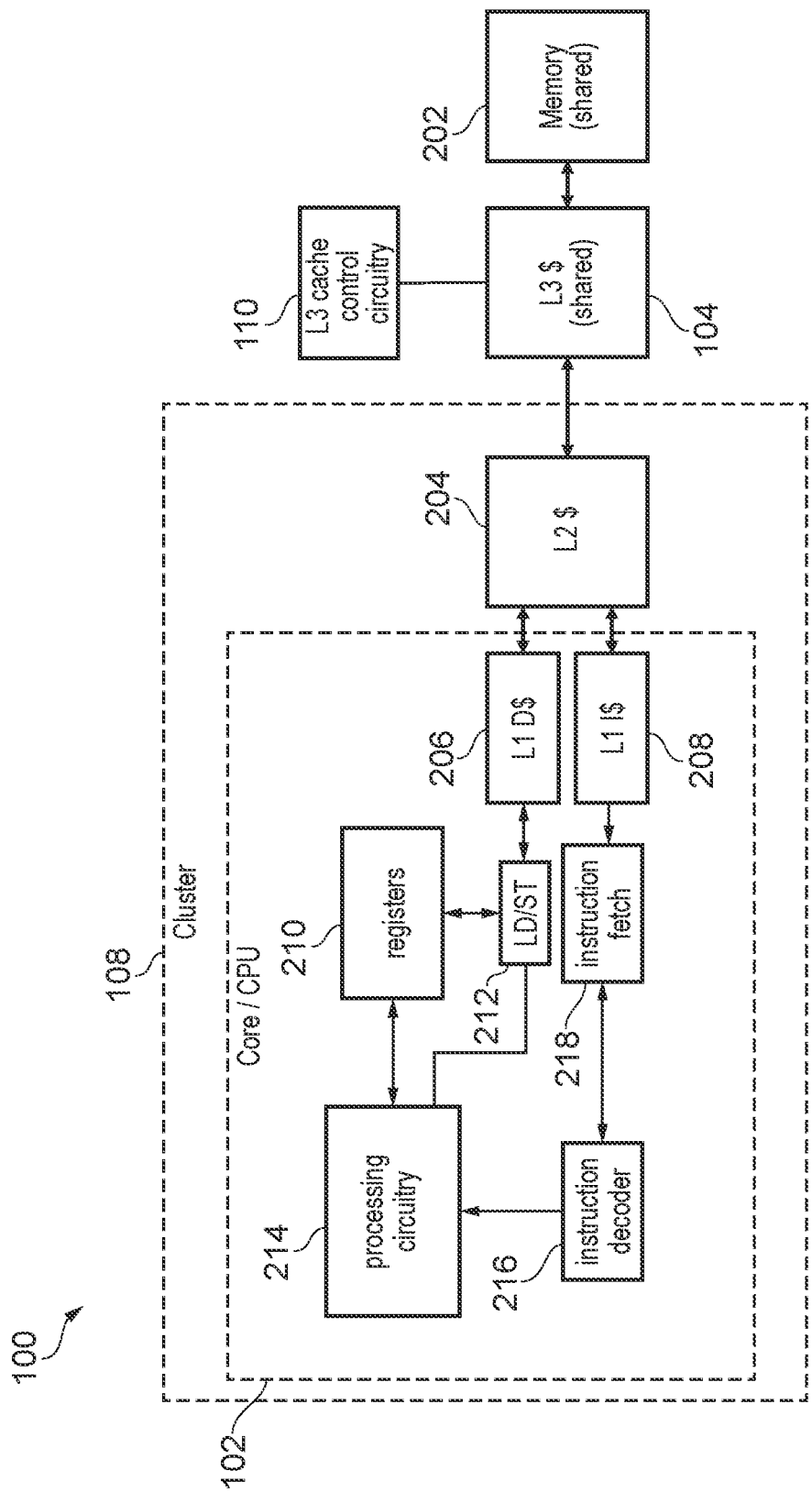
FIG. 2 schematically illustrates some of the components within and accessible to a processing element.

The shared cache 104 stores data that can be accessed by some or all of the processing elements 102—for example, as shown in FIG. 2, the shared cache 104 may be part of the memory system, and may store a subset of data that is also stored in memory (not shown), to allow the processing elements 102 to access the subset of the data with reduced latency. Moreover, there may be further levels of cache provided in addition to the shared cache 104; for example, further shared caches could be provided, either between the shared cache 104 shown and memory, or between the shared cache 104 and the processing elements 102. There may also be further levels of cache within one or more of the processing elements—e.g. caches which are not shared by other processing elements. There could also be a cache provided within the cluster 108 that is shared between all of the processing elements in the cluster.

FIG. 1 also shows cache control circuitry 110, which controls the operation of the shared cache 104. In particular, the cache control circuitry 110 comprises cache configuration control circuitry 112, cache access control circuitry 114 and cache eviction control circuitry 116. The cache access control circuitry 114 controls access to the shared cache 104; in particular, the cache access control circuitry 114 is responsive to access requests issued by the processing elements 102 to determine whether the cache 104 stores data corresponding to a target address specified by the access request (e.g. determines whether a hit condition exists in the cache). When the data is present in the cache, the cache access control circuitry 114 accesses the data and sends a response to the requesting processor element. When the data is not present in the cache (e.g. when a miss condition is detected (e.g. the absence of a hit condition)), the cache access control circuitry 114 may send a request to the next level of the memory system (e.g. this could be a further cache, or it could be memory) for a copy of the data to be stored in the shared cache. Once this copy of the data is provided, the cache access control circuitry may store the data to an available entry in the cache. If no entry is available, then the cache eviction control circuitry 116 may select, based on a cache eviction policy, an entry to be evicted (e.g. invalidated), in order to be replaced with the data fetched from memory. The original access request can then be serviced, either based on the copy of the data now stored in the cache, or in parallel with the retrieved data being stored in the cache.

The cache configuration control circuitry 112 is responsible for determining when to merge multiple cache lines of the shared cache 104 into a merged cache line, and for setting the merge indication state when the cache lines are merged.

FIG. 2 is shows some of the components of the data processing system 100 in more detail. In particular, FIG. 2 shows one of the processing elements 102, which in this case is a central processing unit (CPU). The CPU 102 may be one of the processing elements within the cluster 108, for example, or it may be one of the processing elements coupled directly to the interconnect.

The shared cache 104 is, in this example, a shared level 3 cache, and the figure also shows the cache control circuitry 110 and a shared memory 202 (e.g. shared between the processing elements shown in FIG. 1). The cache 104 stores a subset of data stored in the memory 202, allowing the data in the subset to be accessed with reduced latency—e.g. because the cache 104 is typically much smaller than memory, and hence a given address can be looked up in the cache faster than it could be looked up in memory. Other levels of cache—including a level 2 cache 204 (which may be shared by multiple processing elements within the cluster 108), a level 1 data cache 206 for caching data and a level 1 instruction cache 208 for caching instructions—are also provided in this example.

The CPU of FIG. 2 comprises processing circuitry 214 for performing data processing operations in response to instructions decoded by an instruction decoder 216 (e.g. instruction decode circuitry). The instructions decoded by the instruction decoder 216 are fetched from the instruction cache 208 by instruction fetch circuitry 218.

Based on the decoded instructions, the instruction decoder 216 generates control signals to control the processing circuitry 214 to perform data processing operations represented by the instructions. Operands for the data processing operations are obtained from registers (selected as source registers) in a register file 210 comprising a number of registers. Results of the operations are written back to registers 210 (selected as destination registers) by the processing circuitry 214. For load/store instructions requesting that data from the cache or memory is loaded to the registers 210 or that data in the registers 210 is stored to the cache or memory, a load/store unit 212 may be instructed to carry out the load/store operation. It will be appreciated that the CPU in FIG. 2 is a simplified example of a CPU and that the CPU may include many other elements not shown in FIG. 2 for conciseness.

Figure 3:
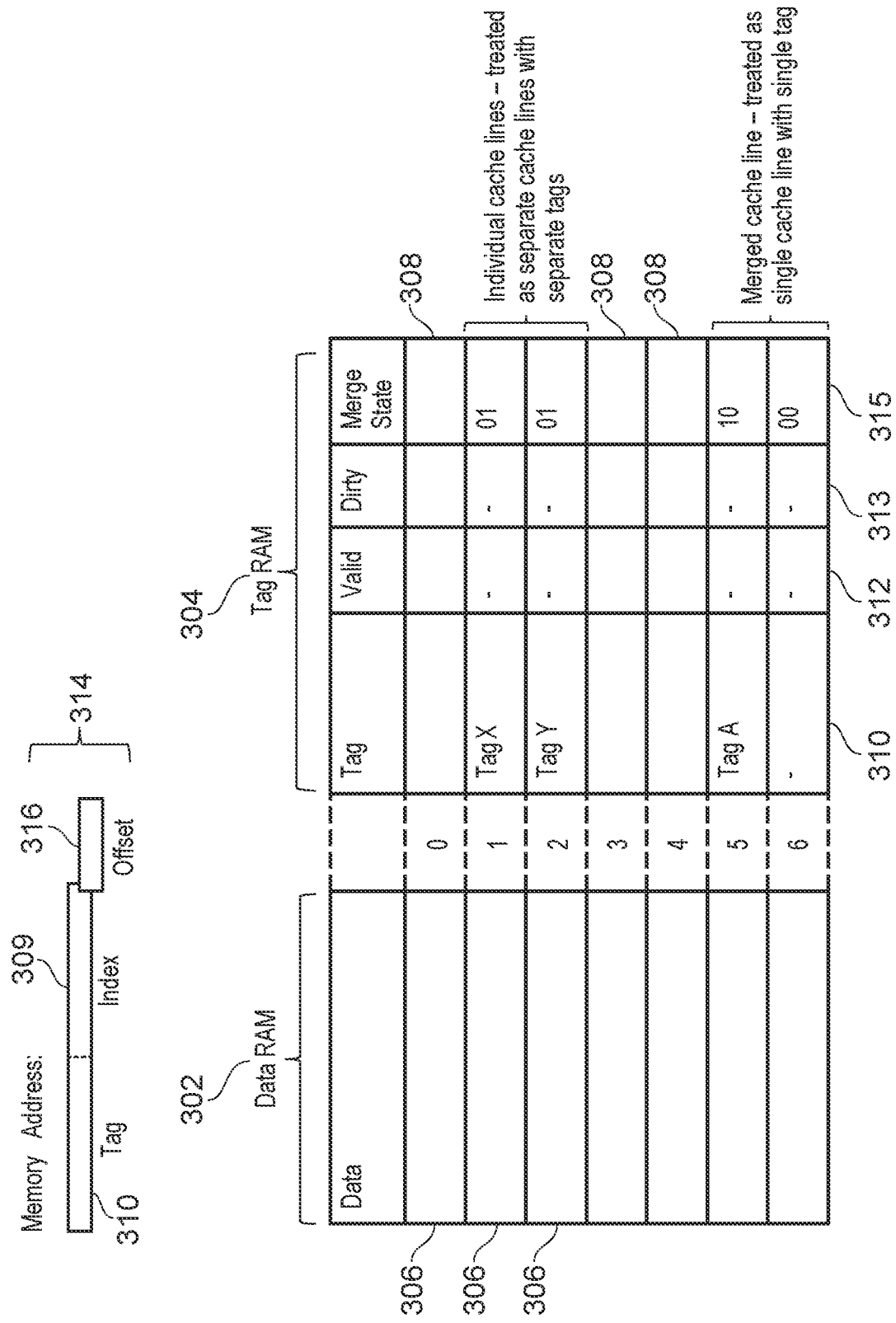
FIG. 3 schematically illustrates a cache comprising a data RAM and a tag RAM.

FIG. 3 shows an example of the shared cache 104 shown in FIGS. 1 and 2. The cache 104 comprises at least one data RAM 302 for storing data blocks and at least one tag RAM 304 for storing address indications—for the sake of clarity, only one data RAM 302 and one tag RAM 304 are shown in FIG. 3; however, it will be appreciated that the cache 104 may comprise additional data RAMs 302 and/or additional tag RAMs 304. As shown in the figure, the data RAM 302 comprises a plurality of entries 306, each of which provides a cache line and is configured to store a block of data, and the tag RAM 304 has a corresponding plurality of entries 308, each of which stores a memory address indication 310 indicating a location in memory associated with the corresponding block of data. In this particular example, the memory address indications 310 are tags, which could—for example—be based on portions of the memory addresses 314 representing the corresponding data blocks in the data RAM 302. However, while the tag 310 is shown in FIG. 3 as a portion of the address 310, it may alternatively be based on the address in some other way—for example, the tag could be a hash of part of the memory address 314. The memory address 314 shown in FIG. 3—which could, for example, be a target address indicated by an access request—also comprises an offset 316, which can be used to specify an individual data element such as a data word within a cache line to be accessed. Moreover, if the cache 104 is a set-associative or direct-mapped cache, the memory address 314 may also be used to derive an index 309, used to identify a particular set (in the example of a set-associative cache) or a particular entry (in the example of a direct-mapped cache) in the cache to check for a hit. The cache 104 shown in FIG. 3 could be any kind of cache (e.g. it could be a fully associative cache—in which case, no index needs to be derived from the memory address—a set-associative cache or a direct-mapped cache); in the case where the cache 106 is a set-associative cache, it will be appreciated that FIG. 3 only shows one of the ways in each set.

Each entry 308 of the tag RAM 304 also includes a valid bit 312, indicating whether the corresponding cache line is valid, and a dirty bit 313, indicating whether the corresponding data block has been modified from the version of the data block stored in memory. In addition to the valid bit 312 and the dirty bit 313, each entry 308 of the tag RAM 304 also includes merge indication state 315, which indicates whether the corresponding cache line is part of a merged cache line. Moreover, it will be appreciated that the tag RAM 304 may also include further fields that are not illustrated, such as a coherency state field, for example.

In the example shown in FIG. 3, the merge indication state 315 comprises a two-bit value for each cache line (e.g. 00, 01, 10 or 11). In this particular example, a value of 00 (e.g. in entry number 6) or 10 (e.g. entry number 5) indicates that the cache line is part of a merged cache line, whereas a value of 01 (e.g. cache lines 1 and 2) indicates that the cache line is not part of a merged cache line. Moreover, the merge indication state can also be used to indicate how many cache lines are part of a merged cache line. For example, a value of 10, in this case, indicates that cache line 5 is part of a merged cache line formed of two cache lines, whereas a value of 11 might be used to indicate a cache line that is part of a merged cache line formed of 4 cache lines. The values of 01 and 00 in cache lines 5 and 6 are, in this example, used to differentiate between the first cache line in a series of adjacent cache lines that are merged (e.g. cache line 5 is the first in a series of two cache lines that are merged) and each other cache line in the merged cache line (e.g. cache line 6). This can be particularly useful when the merged cache line is represented by a common tag (e.g. tag A stored in association with cache line 5) stored in one of the merged cache lines but not in the other.

Hence, in this particular example, the merge state can be interpreted as follows:
  00—part of merged cache line
  01—not part of merged cache line
  10—first of two merged cache lines (stores common tag)
  11—first of four merged cache lines (stores common tag).

However, it will be appreciated that this is just one example of how the merge indication state might be represented. For example, if the cache is capable of supporting merged cache lines formed of 8 or more cache lines, the merge indication state may include an extra bit, so that (for example) a value of 100 represents the first of eight merged cache lines, and so on. Moreover, in yet another example, there might not be a merge indication state field 315 at all—for example, the multiple cache lines forming the merged cache line could be identified by modifying the tag value stored in association with one or more of the multiple cache lines (e.g. by using a null/reserved tag value in each cache line other than the first cache line that collectively form the merged cache line).

Figure 4A:
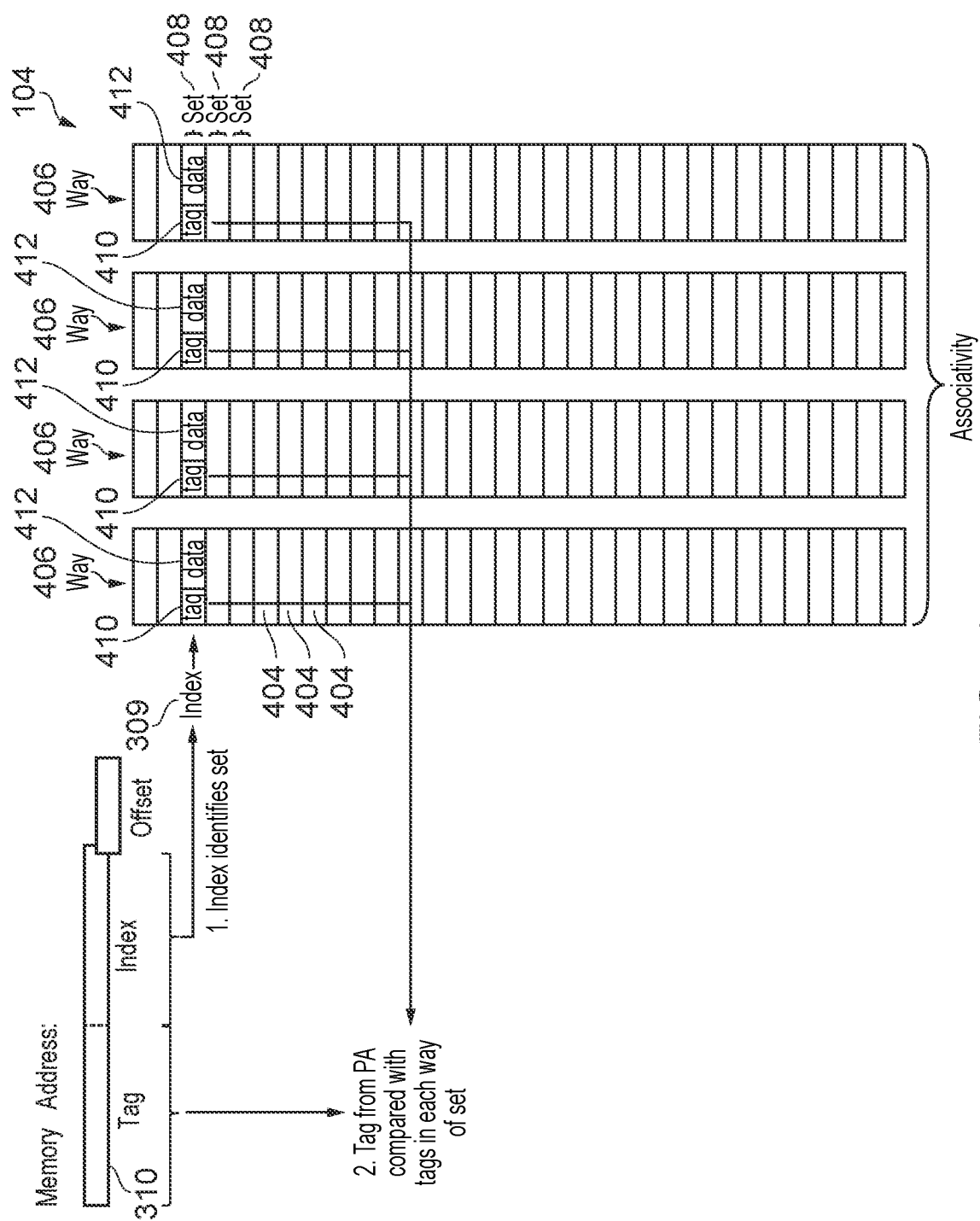
FIGS. 4A and 4B schematically illustrate a set-associative cache.
Figure 4B:
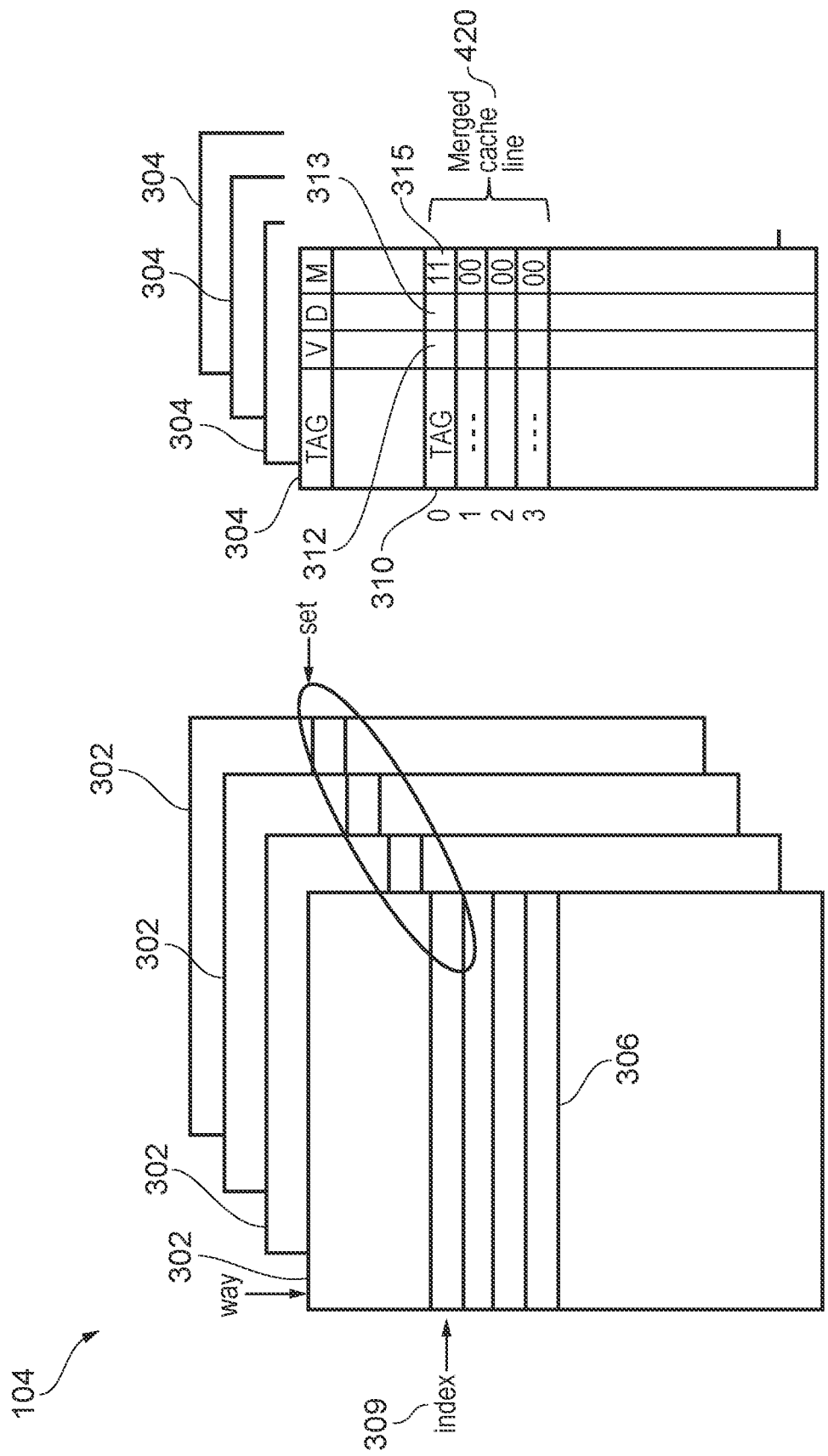

FIGS. 4A and 4B illustrate how the present technique can be implemented in a set-associative cache. As shown in FIG. 4A, a set-associative cache 104 comprises a number of sets 408 of cache entries 404, each set 408 having two or more entries 404 and each entry providing a cache line. For a cache having associativity N, this means that the number of entries in one set 408 is N. Such a cache can be described as an "N-way" set-associative cache and the entries can also be considered to be logically grouped into "ways" 406, where each set 408 comprises one entry 404 from each way 406. For example, a cache with 4 entries per set is 4-way set-associative. It will be appreciated that FIG. 4A merely shows the logical arrangement of the entries 404, and the physical arrangement of the entries 404 may be different. For example, "neighbouring" entries of the same set 408 or the same way 404 may in practice be arranged at separate physical locations in a memory device (for example, see the discussion of FIG. 5 below). Moreover, note that the tag 410 and data 412 of a particular entry might not necessarily be stored together—as shown in FIG. 3, for example, a separate tag RAM 304 and data RAM 302 may be provided, for storing the tags 410 and data 412 respectively. For example, FIG. 4B shows another way of representing a set-associative cache, which in that example comprises a plurality of data RAMs 302 (one for each way) and a corresponding plurality of tag RAMs 304.

The set-associative placement policy used for such a cache means that when data having a given address needs to be allocated into the cache, it is placed in one of the entries 404 within a particular set 408 that is selected based on an index value 309 computed based on the given address. Hence, data associated with a given address cannot be stored in entries 404 of sets 408 other than the set corresponding to the index 309 selected based on the given address. This is useful because it reduces the number of entries of the cache which have to be checked to determine whether the cache stores data associated with a specified target address, but in comparison to a direct-mapped cache (where data for a given address can only be allocated to a single entry 404 selected based on the address), the set-associative placement scheme improves performance as there is flexibility to allocate data for a given address to two or more locations, which reduces the likelihood of thrashing as it means two or more different addresses mapping to the same set can each be cached simultaneously. However, it will be appreciated that the present technique can also be implemented in caches with other placement policies, such as direct-mapped caches and fully associative caches.

Each entry 404 may specify a cache tag value 410 (e.g. memory address indication) and a data value (block of data) 412. The data value 412 is the block of data stored in the cache line provided by the corresponding cache entry 404. The data value 412 could be data or instructions, or could be address mapping information cached in a translation lookaside buffer, for example. The tag 410 corresponds to a portion of the target address which is not used to generate the index, and is stored alongside the cached data 412 to allow the different addresses which map to the same index to be distinguished from each other when looking up in the cache. As explained above, each entry 404 may also store state information associated with the corresponding memory address indication, such as a valid indicator indicating whether the data in the corresponding entry 404 is valid, coherency state information (e.g. a dirty bit indicating whether the data value 412 has been modified compared to the corresponding data value in a lower level cache or memory), or replacement policy information for selecting a victim cache entry when an entry needs to be evicted from the cache. Moreover, as discussed above and as shown in FIG. 4B, each entry may also be associated with a merge state field 315. The merge state field 315 associated with each entry holds a value (in this example, the value is a two-bit value) indicating whether the cache line is part of a merged cache line. In this particular example, one of the entries has a merge indication state of 11, to indicate that it is the first of four cache lines that form a merged cache line, while the other three cache lines in the merged cache line each have a merge indication state of 00. Although not shown, the merge indication state for any cache lines that are not part of a merged cache line may be set, in this example, to 01. Moreover, the address indication entry of the first of the four merged cache lines stores a common tag (e.g. a common address indication), representative of the entire merged cache line. The address indication entries of the other cache lines in the merged cache line may, for example, be set to some reserved value (e.g. all zeroes or all ones).

On a cache access to check whether data associated with a target address is stored in the cache, the index value 309 derived from the target memory address (also referred to as a target address—this could be a physical address or a virtual address) is used to select a set 408 and each of the tag values 410 in the entries 404 within the selected set 408 are compared with the tag portion of the target address. If any of the read tag values 410 match the tag portion of the target address then the corresponding cache entry 404 having the matching tag 410 stores the data for the requested target address, and that entry can be read or written depending on the type of access being performed. The scenario when one of the tags 410 in the indexed set 408 matches the tag of the target address is called a cache hit.

On the other hand, if none of the tags 410 in the indexed set 408 match the tag of the target address, then this is known as a cache miss, and in this case the information associated with the target address may need to be fetched from a further data store, such as a further level of cache or main memory. If one of the entries in the indexed set is invalid, then the invalid entry can be selected for allocating the new data associated with a target address. However, if all of the indexed set of entries are already filled with valid data then one entry 404 of the indexed set 408 can be selected as a victim entry for which the data 412 is to be evicted from the cache to make way for the new information associated with the target address.

It will be appreciated that if the tag portions of cache lines 1, 2 and 3 have been set to a reserved value, then a hit will not typically be detected against any of those entries. However, as explained above, a hit against cache line 0 is treated as a hit against the merged cache line formed of cache lines 0, 1, 2 and 3, and all of these cache lines may be accessed together. Hence, since each of the cache lines forming the merged cache line is in a different set (associated with a different index), one might assume that an access request specifying a target memory address corresponding to the data in one of cache lines 1, 2 and 3 would result in a miss, since none of the address indication entries stores a tag corresponding to the specified memory address. In some implementations, this might be the case. However, in other implementations, the cache access control circuitry may be responsive to an access request specifying a target memory address corresponding to the data in one of entries 1, 2 and 3, to use a modified version of the index, that allows the set holding cache line 0 to be accessed. In this way, an access request for data stored in any one of entries 0, 1, 2 and 3 results in a hit against the merged cache line. In a particular example, since the multiple cache lines forming the merged cache line are adjacent to one other, it may be sufficient for the cache access control circuitry to simply disregard a number of the least significant bits in the index.

In the examples described above, the tag of a cache line forming part of a merged cache line is set to some reserved value, unless it stores the common tag portion (e.g. common address indication) for the entire merged cache line. However, in other implementations this may not be the case. For example, the common tag may be replicated and stored in association with each cache line forming the merged cache line. This has the advantage that a hit can still be detected against any one of the cache lines in the merged cache line, without any modification to the index being necessary.

Figure 5:
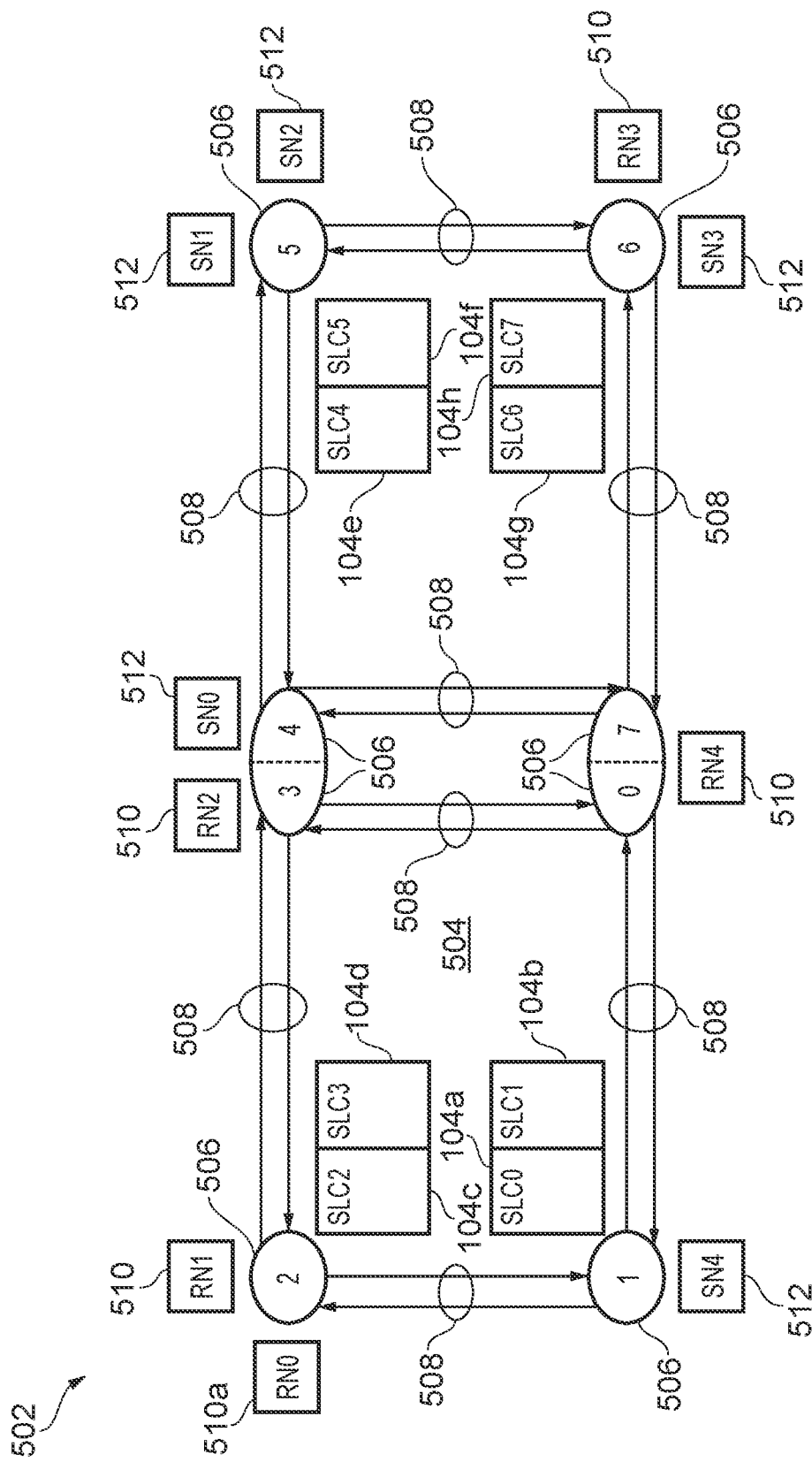
FIG. 5 schematically illustrates a network comprising multiple request nodes and slave nodes, and a shared cache distributed across the network.

FIG. 5 shows an example of network 502 of devices coupled to one another by a ring interconnect 504. The ring interconnect (an example of interconnect circuitry) 504 comprises a plurality of nodes 506 coupled to one another by a plurality of links 508. Processing elements, including request nodes 510 and slave nodes 512, are coupled to the interconnect 504 at the nodes 506, and are hence coupled to one another via the interconnect 504. Accordingly, messages (e.g. in the form of packets) can be sent between the processing elements via the nodes 506 and links 508 of the interconnect—as such, the nodes and links provide communication pathways between the processing elements coupled to the interconnect 504.

The network 502 also includes a shared cache 104 which is shared between all of the processing elements 510, 512 coupled to the interconnect 504 and which, in this example, is distributed across different locations in the network 504. In particular, the shared cache 104 comprises 8 cache slices 104a-104h: slices SLC0 104a and SLC1 104b associated with (e.g. coupled to) node 1; slices SLC2 104c and SLC3 104d associated with node 2; slices SLC4 104e and SLC5 104f associated with node 5; and slices SLC6 104g and SLC7 104h associated with node 6. It will be appreciated that the number of slices that can be provided is not limited to 8—there may be more than 8 or fewer than 8 slices, and the slices may be associated with a different set of the nodes 506 (e.g. there may also/alternatively be slices associated with nodes 0, 3, 4, and 7). Each slice comprises a subset of the cache lines provided by the shared cache 104, and the associated address indication entries (e.g. providing the tags) associated with those cache lines. There may also be separate cache control circuitry (not shown) for each cache slice. Access requests issued by the request nodes 510 are directed to different slices of the cache, dependent on the target addresses specified by those access requests. This means that traffic to and from the cache 104 is spread across the interconnect, rather than being confined to a particular set of communication pathways, improving bandwidth, and also allows multiple cache slices to be accessed in parallel, reducing latency.

However, a downside of having the cache distributed across the interconnect 504 is increased latency associated with some access requests. For example, the path between request node RN0 510a and slice SLC7 104h is long, and hence the latency associated with servicing an access request issued by RN0 510a for data stored in slice SLC7 104h would be high. This latency may be especially problematic if request node RN0 requires access to blocks of data spanning two or more cache lines in slice SLC7 104h, since this would typically require making separate access requests for each cache line, hence multiplying the latency associated with accessing the data.

Hence, the present technique—which allows multiple cache lines to be merged into a single merged cache line, which can be accessed in response to a single access request—is particularly advantageous in distributed caches such as the one shown in FIG. 5.

Figure 6:
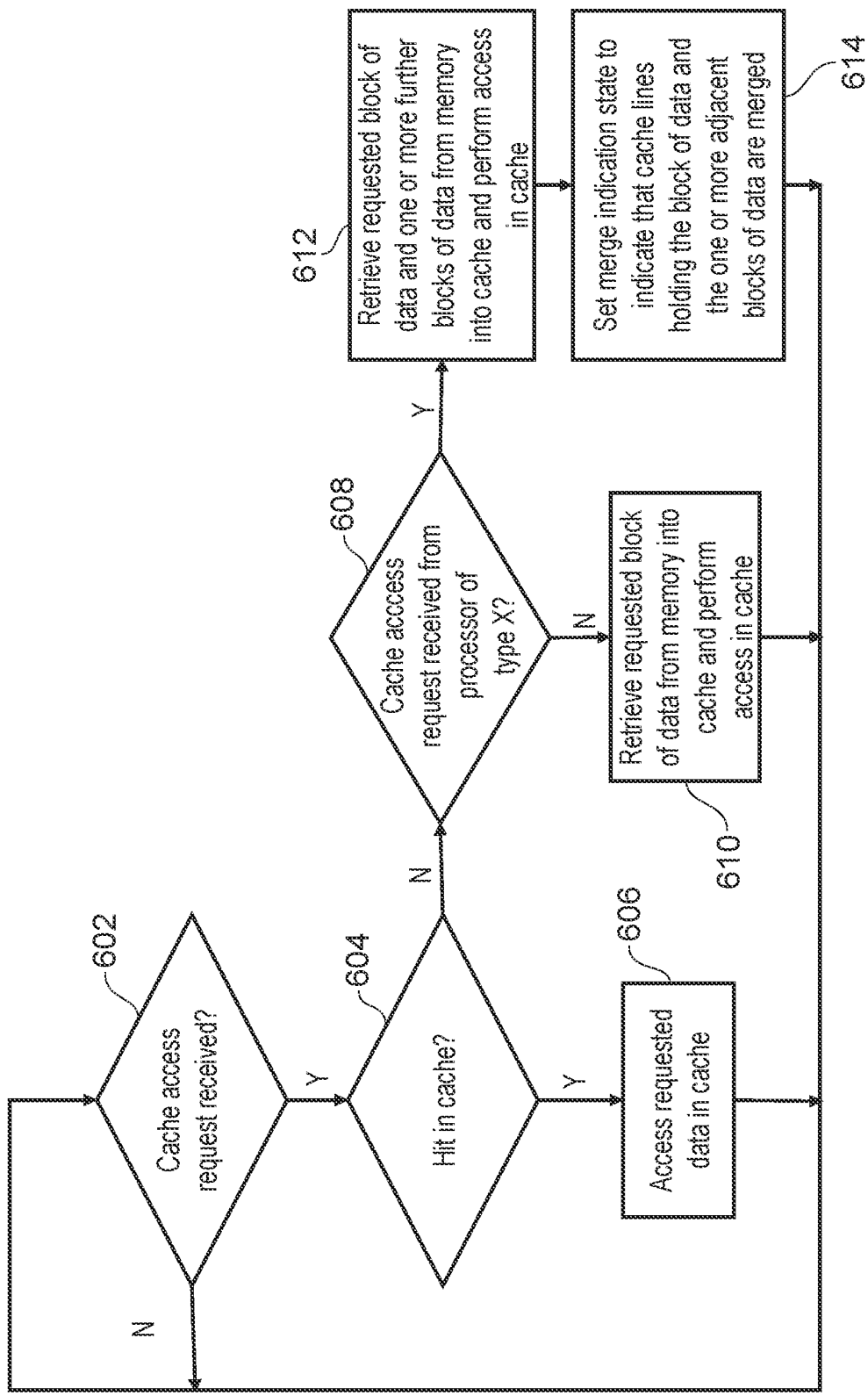
FIG. 6 is a flow diagram illustrating an example method performed by the cache control circuitry.

FIG. 6 is a flow diagram illustrating an example method of accessing the cache of the present technique. In the illustrated method, when the cache access control circuitry determines 602 that an access request has been received ("Y"), it then determines 604 whether a hit condition exists in respect of the requested data (e.g. whether a memory address indication derived from the target address of the access request matches a memory address indication of a cache line in the cache). If there is a hit ("Y"), the requested data is accessed 606 in the cache. On the other hand, if there is not a hit ("N")—e.g. if the cache access control circuitry detects a miss—the cache configuration control circuitry determines 608 whether the processing element that issued the access request is of a given type (type X, in this example). In other words, in this example, the cache configuration control circuitry is responsive to detection of a miss (e.g. responsive to the absence of a hit) to check whether a particular merging trigger condition is met; hence, the merging trigger event in this example is a receipt of an access request from a processor of type X.

If it is determined 608 that the processor is not of the given type ("N"), the merging trigger event has not been detected, and hence the requested block of data is retrieved 610 from memory and then accessed in the cache. On the other hand, if it is determined 608 that the processor is of type X ("Y")—e.g. a detection of the merging trigger event—then the cache access control circuitry retrieves 612 the requested block of data and one or more other blocks of data from memory into the cache and performs an access in the cache, and the cache configuration control circuitry sets 614 the merge indication state associated with the multiple blocks of data in the cache to indicate that they form part of a merged cache line.

Figure 7:
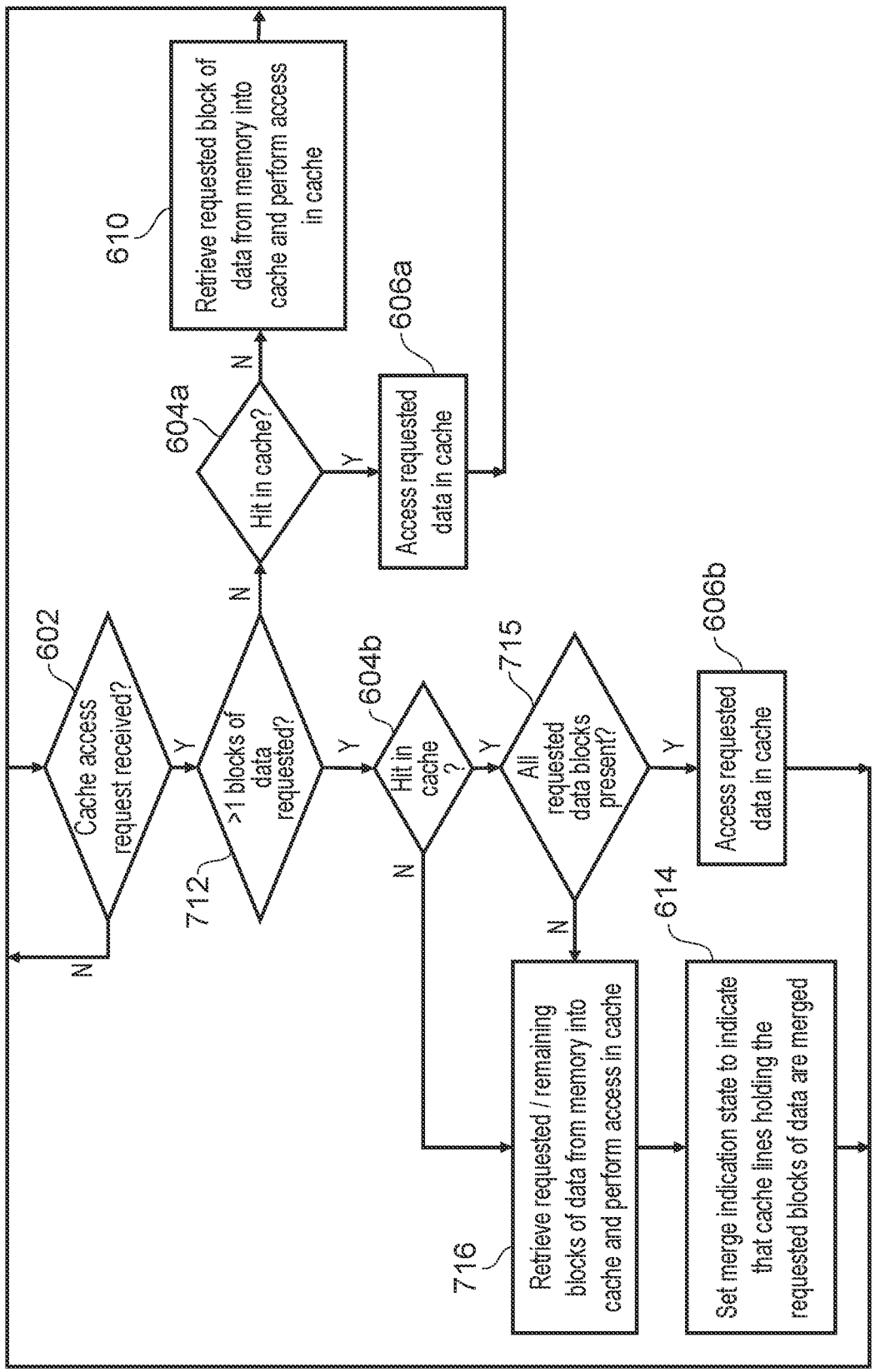
FIG. 7 is a flow diagram illustrating another example method performed by the cache control circuitry.

FIG. 7 shows another example of a method of accessing the cache. In this example, the merging trigger event is a detection of an access request that requests access to data spanning more than one cache line.

In particular, FIG. 7 involves a step 602 of determining whether an access has been received. When an access request has been received, it is determined 712 whether the access request is for access to multiple blocks of data (e.g. in multiple cache lines)—for example, the outcome of this step could be dependent on an indication, provided with the access request, of the number of cache lines to be accessed. When the access request is for a single cache line (e.g. the packet containing the access request indicates that only one cache line's worth of data is requested, or does not indicate a number of cache lines to be accessed) ("N"), the cache access control circuitry determines 604a whether there is a hit in the cache. If there is a hit ("Y"), the data is accessed 606a in the cache, whereas if there is not a hit ("N"), the requested data is retrieved 610 from memory into the cache and the access is performed in the cache.

Returning to step 712, the cache access control circuitry also determines 604b whether there is a hit in the cache when it is determined (712) that more than one block of data (e.g. data spanning more than one cache line) is requested ("Y"). Then, if a hit is detected ("Y"), the cache access circuitry determines 715 whether all of the requested data blocks are currently present in the cache. If all of the requested data blocks are present in the cache ("Y"), the cache access circuitry accesses 606b the data in the cache. On the other hand, if it is determined 715 that one or more of the requested data blocks are absent from the cache ("N"), the cache access control circuitry retrieves 716 the requested data blocks that are not present in the cache from memory and then performs the access in the cache. In addition, the cache configuration control circuitry sets 614 the merge indication state to indicate that the cache lines holding the multiple blocks of data are merged. On the other hand, if, at step 604b, a miss was detected, the cache access control circuitry retrieves 716 all of the requested data blocks from memory and performs the access in the cache, and the cache configuration control circuitry sets 614 the merge indication state as discussed above.

The cache may operate according to either of the methods shown in FIGS. 6 and 7, or a combination of both methods, to provide a configurable arrangement of cache lines. In particular, the cache configuration control circuitry is responsive to a merging trigger event—e.g. a detection 608 that the requesting processor is of a given type, or a detection 712 that more than one block of data is requested—to merge multiple cache lines. Also, although not explicitly shown in these figures, the cache configuration control circuitry may be responsive to an unmerge trigger event to clear the merge indication state associated with a merged entry in the cache. Moreover, it should be appreciated that FIGS. 6 and 7 show some of the ways in which a merging trigger event may be detected, but there are also many other possible merging trigger events that can be implemented. For example, a processing element could explicitly request that two cache lines be merged, or the cache configuration control circuitry could monitor access patterns for entries of the cache to determine whether to merge entries.

Whichever approach is used, the present technique allows multiple cache lines to be merged to form a merged cache line, which provides reduced latency for processors which require access to data spanning multiple cache lines.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

Examples of the present technique are set out in the following clauses:

(1) An apparatus comprising:
a cache providing a plurality of cache lines and associated address indication entries, each cache line arranged to store a block of data and the associated address indication entry arranged, by default, to store a memory address indication for the block of data;
cache access control circuitry, responsive to an access request issued by at least one processing element and indicating a target memory address, to determine whether a hit condition is present in the cache, the hit condition being present when a given cache line is determined, with reference to the memory address indication stored in the associated address indication entry, to store data associated with the target memory address; and
cache configuration control circuitry to set, in response to detecting a merging trigger event, merge indication state to identify multiple cache lines amongst the plurality of cache lines that are to be treated as a merged cache line to store multiple blocks of data,
wherein when the merge indication state indicates that the given cache line is part of the merged cache line, the cache access control circuitry is responsive to detecting the hit condition to allow access to any of the data blocks stored in the multiple cache lines forming the merged cache line.

(2) The apparatus of clause 1, wherein
in absence of the merge indication state indicating that the given cache line is part of the merged cache line, the cache access control circuitry is responsive to detecting the hit condition to access only the data block of the given cache line.

(3) The apparatus of clause 1 or clause 2, wherein
the multiple blocks of data in the merged cache line have a common memory address indication.

(4) The apparatus of clause 3, wherein
the cache configuration control circuitry is arranged to cause the common memory address indication to be stored in the address indication entry of one of the multiple cache lines forming the merged cache line.

(5) The apparatus of any preceding clause, wherein
the cache configuration control circuitry is configured to store the merge indication state in association with at least one address indication entry associated with one of the multiple cache lines forming the merged cache line.

(6) The apparatus of any preceding clause, wherein
the cache is shared between multiple processing elements including the at least one processing element.

(7) The apparatus of clause 6, comprising
interconnect circuitry to provide communication pathways between the multiple processing elements, the multiple processing elements being coupled to the interconnect circuitry,
wherein the cache is separated into multiple slices, and at least two of the slices are associated with different parts of the interconnect circuitry.

(8) The apparatus of clause 7, wherein:
the interconnect circuitry comprises a ring interconnect formed of nodes and links between the nodes;
the multiple processing elements are each connected to one of the nodes; and
the at least two of the slices are associated with different nodes.

(9) The apparatus of any preceding clause, wherein:
the merging trigger event comprises one of a set of merging trigger events; and
the set of merging trigger events comprises at least one of:
a request from the at least one processing element to merge the multiple cache lines to form the merged cache line;
a determination that a pattern of previous accesses to the multiple cache lines meets at least one criterion; and
a determination that the at least one processing element is of a given type.

(10) The apparatus of any preceding clause, wherein
the cache configuration control circuitry is responsive to an unmerge trigger event to clear the merge indication state to indicate that the multiple cache lines are to be treated as independent cache lines.

(11) The apparatus of any preceding clause, wherein:
the cache comprises an N-way set-associative cache comprising a plurality of sets, each set comprising a cache line from each way;

the cache access control circuitry is responsive to the access request to identify a given set based on a portion of the target memory address and determine whether the hit condition is present for any cache line of the given set; and when the merge indication state indicates that the given cache line for which the hit condition is detected is part of the merged cache line, the multiple cache lines forming the merged cache line are cache lines in the same way as the way containing the given cache line.

(12) The apparatus of any preceding clause, wherein the multiple cache lines forming the merged cache line are adjacent to each other in the cache.

(13) The apparatus of clause 12, wherein:
the cache configuration control circuitry is configured to store the merge indication state in association with one or more of the multiple cache lines forming the merged cache line; and the cache access control circuitry is configured to identify, when the merge indication state comprises a predetermined value stored in association with the given cache line, a series of one or more cache lines adjacent to each other and to the given cache line as forming the merged cache line together with the given cache line.

(14) The apparatus of any preceding clause, comprising cache eviction control circuitry configured to apply a cache eviction policy to select a selected cache line whose data block is to be evicted from the cache to allow a different data block to be stored in the selected cache line, wherein the cache eviction control circuitry is configured to avoid selecting, as the selected cache line, one of the multiple cache lines forming the merged cache line without also selecting the others of the multiple cache lines.

(15) The apparatus of any preceding clause, wherein:
the cache comprises a merge indication state field associated with each of the plurality of cache lines; and the cache configuration control circuitry is responsive to detecting the merging trigger event to set, as the merge indication state, a value in the merge indication state field associated with each of the multiple cache lines forming the merged cache line.

(16) The apparatus of any preceding clause, wherein the multiple cache lines forming the merged cache line comprise $2^N$ cache lines, wherein N is an integer.

(17) The apparatus of any preceding clause, wherein communication between the at least one processing element and the cache comprises packets comprising an indication of a number of cache lines accessed in response to the access request.

(18) The apparatus of clause 17, wherein:
the merging trigger event comprises a request from the at least one processing element to merge the multiple cache lines to form the merged cache line; and the request comprises, in the packet, an indication that the number of cache lines to be accessed is greater than or equal to 2.

(19) A method comprising:
providing, in a cache, a plurality of cache lines and associated address indication entries, each cache line arranged to store a block of data and the associated address indication entry arranged, by default, to store a memory address indication for the block of data;

determining, in responsive to an access request issued by at least one processing element and indicating a target memory address, whether a hit condition is present in the cache, the hit condition being present when a given cache line is determined, with reference to the memory address indication stored in the associated address indication entry, to store data associated with the target memory address;

setting, in response to detecting a merging trigger event, merge indication state to identify multiple cache lines amongst the plurality of cache lines that are to be treated as a merged cache line to store multiple blocks of data; and allowing, when the merge indication state indicates that the given cache line is part of the merged cache line, in response to detecting the hit condition, access to any of the data blocks stored in the multiple cache lines forming the merged cache line.

(20) A non-transitory computer-readable medium to store computer-readable code for fabrication of an apparatus comprising:
a cache providing a plurality of cache lines and associated address indication entries, each cache line arranged to store a block of data and the associated address indication entry arranged, by default, to store a memory address indication for the block of data;

cache access control circuitry, responsive to an access request issued by at least one processing element and indicating a target memory address, to determine whether a hit condition is present in the cache, the hit condition being present when a given cache line is determined, with reference to the memory address indication stored in the associated address indication entry, to store data associated with the target memory address; and cache configuration control circuitry to set, in response to detecting a merging trigger event, merge indication state to identify multiple cache lines amongst the plurality of cache lines that are to be treated as a merged cache line to store multiple blocks of data;

wherein when the merge indication state indicates that the given cache line is part of the merged cache line, the cache access control circuitry is responsive to detecting the hit condition to allow access to any of the data blocks stored in the multiple cache lines forming the merged cache line.

We claim:

1. An apparatus comprising:
a cache providing a plurality of cache lines and associated address indication entries, each cache line arranged to store a block of data and the associated address indication entry arranged, by default, to store a memory address indication for the block of data;

cache access control circuitry, responsive to an access request issued by at least one processing element and indicating a target memory address, to determine whether a hit condition is present in the cache, the hit condition being present when a given cache line is determined, with reference to the memory address indication stored in the associated address indication entry, to store data associated with the target memory address; and cache configuration control circuitry to set, in response to detecting a merging trigger event, merge indication state to identify multiple cache lines amongst the plurality of cache lines that are to be treated as a merged cache line to store multiple blocks of data, wherein:
when the merge indication state indicates that the given cache line is part of the merged cache line, the cache access control circuitry is responsive to detecting the hit condition to allow access to any of the data blocks stored in the multiple cache lines forming the merged cache line;
the merging trigger event comprises one of a set of merging trigger events; and
the set of merging trigger events comprises at least one of:
a request from the at least one processing element to merge the multiple cache lines to form the merged cache line;
a determination that a pattern of previous accesses to the multiple cache lines meets at least one criterion; and
a determination that the at least one processing element is of a given type.

2. The apparatus of claim 1, wherein
in absence of the merge indication state indicating that the given cache line is part of the merged cache line, the cache access control circuitry is responsive to detecting the hit condition to access only the data block of the given cache line.

3. The apparatus of claim 1, wherein
the multiple blocks of data in the merged cache line have a common memory address indication.

4. The apparatus of claim 3, wherein
the cache configuration control circuitry is arranged to cause the common memory address indication to be stored in the address indication entry of one of the multiple cache lines forming the merged cache line.

5. The apparatus of claim 1, wherein
the cache configuration control circuitry is configured to store the merge indication state in association with at least one address indication entry associated with one of the multiple cache lines forming the merged cache line.

6. The apparatus of claim 1, wherein
multiple processing elements share access to the cache, wherein the multiple processing elements include the at least one processing element and at least one further processing element.

7. The apparatus of claim 6, comprising
interconnect circuitry to provide communication pathways between the multiple processing elements, the multiple processing elements being coupled to the interconnect circuitry,
wherein the cache is separated into multiple slices, and at least two of the slices are associated with different parts of the interconnect circuitry.

8. The apparatus of claim 7, wherein:
the interconnect circuitry comprises a ring interconnect formed of nodes and links between the nodes;
the multiple processing elements are each connected to one of the nodes; and
the at least two of the slices are associated with different nodes.

9. The apparatus of claim 1, wherein:
the cache comprises an N-way set-associative cache comprising a plurality of sets, each set comprising a cache line from each way;
the cache access control circuitry is responsive to the access request to identify a given set based on a portion of the target memory address and determine whether the hit condition is present for any cache line of the given set; and
when the merge indication state indicates that the given cache line for which the hit condition is detected is part of the merged cache line, the multiple cache lines forming the merged cache line are cache lines in the same way as the way containing the given cache line.

10. The apparatus of claim 1, wherein
the multiple cache lines forming the merged cache line are adjacent to each other in the cache.

11. The apparatus of claim 10, wherein:
the cache configuration control circuitry is configured to store the merge indication state in association with one or more of the multiple cache lines forming the merged cache line; and
the cache access control circuitry is configured to identify, when the merge indication state comprises a predetermined value stored in association with the given cache line, a series of one or more cache lines adjacent to each other and to the given cache line as forming the merged cache line together with the given cache line.

12. The apparatus of claim 1, comprising
cache eviction control circuitry configured to apply a cache eviction policy to select a selected cache line whose data block is to be evicted from the cache to allow a different data block to be stored in the selected cache line,
wherein the cache eviction control circuitry is configured to avoid selecting, as the selected cache line, one of the multiple cache lines forming the merged cache line without also selecting the others of the multiple cache lines.

13. The apparatus of claim 1, wherein:
the cache comprises a merge indication state field associated with each of the plurality of cache lines; and
the cache configuration control circuitry is responsive to detecting the merging trigger event to set, as the merge indication state, a value in the merge indication state field associated with each of the multiple cache lines forming the merged cache line.

14. The apparatus of claim 1, wherein
the multiple cache lines forming the merged cache line comprise $2^N$ cache lines, wherein N is an integer.

15. The apparatus of claim 1, wherein
communication between the at least one processing element and the cache comprises packets comprising an indication of a number of cache lines accessed in response to the access request.

16. The apparatus of claim 15, wherein:
the set of merging trigger events comprises a request from the at least one processing element to merge the multiple cache lines to form the merged cache line; and
the request comprises, in the packet, an indication that the number of cache lines to be accessed is greater than or equal to 2.

17. A non-transitory computer-readable medium to store computer-readable code for fabrication of the apparatus of claim 1.

18. An apparatus comprising:
a cache providing a plurality of cache lines and associated address indication entries, each cache line arranged to store a block of data and the associated address indication entry arranged, by default, to store a memory address indication for the block of data;
cache access control circuitry, responsive to an access request issued by at least one processing element and indicating a target memory address, to determine whether a hit condition is present in the cache, the hit condition being present when a given cache line is determined, with reference to the memory address indication stored in the associated address indication entry, to store data associated with the target memory address; and cache configuration control circuitry to set, in response to detecting a merging trigger event, merge indication state to identify multiple cache lines amongst the plurality of cache lines that are to be treated as a merged cache line to store multiple blocks of data, wherein:

when the merge indication state indicates that the given cache line is part of the merged cache line, the cache access control circuitry is responsive to detecting the hit condition to allow access to any of the data blocks stored in the multiple cache lines forming the merged cache line; and the cache configuration control circuitry is responsive to an unmerge trigger event to clear the merge indication state to indicate that the multiple cache lines are to be treated as independent cache lines.

19. A method comprising:

providing, in a cache, a plurality of cache lines and associated address indication entries, each cache line arranged to store a block of data and the associated address indication entry arranged, by default, to store a memory address indication for the block of data;

determining, in responsive to an access request issued by at least one processing element and indicating a target memory address, whether a hit condition is present in the cache, the hit condition being present when a given cache line is determined, with reference to the memory address indication stored in the associated address indication entry, to store data associated with the target memory address;

setting, in response to detecting a merging trigger event, merge indication state to identify multiple cache lines amongst the plurality of cache lines that are to be treated as a merged cache line to store multiple blocks of data; and allowing, when the merge indication state indicates that the given cache line is part of the merged cache line, in response to detecting the hit condition, access to any of the data blocks stored in the multiple cache lines forming the merged cache line, wherein:

the merging trigger event comprises one of a set of merging trigger events; and the set of merging trigger events comprises at least one of:
- a request from the at least one processing element to merge the multiple cache lines to form the merged cache line;
- a determination that a pattern of previous accesses to the multiple cache lines meets at least one criterion; and
- a determination that the at least one processing element is of a given type.

* * * * *